(12) United States Patent
Mazhari et al.

(10) Patent No.: US 12,233,604 B1
(45) Date of Patent: Feb. 25, 2025

(54) AUGMENTED MANUFACTURING BY EMBEDDING AUTONOMOUS INTERACTIONS BETWEEN MANUFACTURED COMPONENTS AND MANUFACTURING MACHINES

(71) Applicant: United States of America as Represented by the Administrator of NASA, Washington, DC (US)

(72) Inventors: Arash Mazhari, San Jose, CA (US); Rachel Lackritz Ticknor, Cupertino, CA (US); Daniel Walton Cellucci, Ithaca, NY (US); Dean Peter Giovannetti, San Jose, CA (US); Sean Shan-Min Swei, Gilroy, CA (US)

(73) Assignee: United States of America as represented by the Administrator of NASA, Washington, DC (US)

(*) Notice: Subject to any disclaimer, the term of this patent is extended or adjusted under 35 U.S.C. 154(b) by 0 days.

(21) Appl. No.: 17/149,712

(22) Filed: Jan. 14, 2021

(51) Int. Cl.
  *B29C 64/393* (2017.01)
  *B29C 64/209* (2017.01)
  (Continued)

(52) U.S. Cl.
  CPC .......... *B29C 64/393* (2017.08); *B29C 64/209* (2017.08); *B29C 64/227* (2017.08); *B33Y 80/00* (2014.12); *B29L 2031/774* (2013.01)

(58) Field of Classification Search
  CPC ... B29C 64/393; B29C 64/209; B29C 64/227; B33Y 80/00; B29L 2031/774
  See application file for complete search history.

(56) References Cited

U.S. PATENT DOCUMENTS

| 7,766,641 B2 | 8/2010 | Silverbrook |
| 2017/0057080 A1* | 3/2017 | Krohne ................. B25J 11/005 |

(Continued)

OTHER PUBLICATIONS

Mazhari et al. "Printing and Programming of In-Situ Actuators" from "2020 IEEE/ASME International Conference on Advanced Intelligent Mechatronics (AIM), Boston, USA (Virtual Conference), Jul. 6-9, 2020" (Year: 2020).*

(Continued)

*Primary Examiner* — Yuhui R Pan
(74) *Attorney, Agent, or Firm* — Rhys W. Cheung; Robert M. Padilla; Trenton J. Roche (57) ABSTRACT

Augmenting the functionality of an off-the-shelf additive manufacturing machine, such as a 3D printer, by generating a component design having an autonomy characteristic, and that may impart a functionality to one or more components manufactured by the additive manufacturing machine that is based on an interaction between the component and the additive manufacturing machine. The design includes code for instructing the additive machine to build an ancillary component, such as a cantilever spring, and build the primary manufactured object, and use the cantilever spring to propel the object off the build platform. In this manner the functionality of an off-the-shelf additive manufacturing machine is expanded without physical modification of the machine, and can be implemented remotely to embed additional functionality into designed components that are to be fabricated, for example on spacecraft where physical retrofits are impractical. Other applications include parts and material testing and rapid prototyping.

16 Claims, 6 Drawing Sheets

(51) Int. Cl.
    B29C 64/227    (2017.01)
    B33Y 80/00     (2015.01)
    B29L 31/00     (2006.01)

(56) References Cited

U.S. PATENT DOCUMENTS

2019/0105838 A1    4/2019   Hicks et al.
2019/0270242 A1*   9/2019   Medalsy ............... B29C 64/255

OTHER PUBLICATIONS

Katakura et al. "PrintMotion: Actuating Printed Objects Using Actuators Equipped in a 3D Printer" from "UIST'18 Adjunct, Oct. 14-17, 2018, Berlin, Germany" (Year: 2018).*

Qureshi et al. "Numerical investigation of band gaps in 3D printed cantilever-in-mass metamaterials" from "Scientific Reports Published: Jun. 22, 2016" (Year: 2016).*

P. Dudek, "Fdm 3d printing technology in manufacturing composite elements," Archives of Metallurgy and Materials, vol. 58, No. 4, pp. 1415-1418, 2013.

P. Shakor, S. Nejadi, G. Paul, and S. Malek, "Review of emerging additive manufacturing technologies in 3d printing of cementitious materials in the construction industry," Frontiers in Built Environment, vol. 4, p. 85, 2019.

P. Urhal, A. Weightman, C. Diver, and P. Bartolo, "Robot assisted additive manufacturing: A review," Robotics and Computer-Integrated Manufacturing, vol. 59, pp. 335-345, 2019.

Q. Ge, A. H. Sakhaei, H. Lee, C. K. Dunn, N. X. Fang, and M. L. Dunn, "Multimaterial 4d printing with tailorable shape memory polymers," Scientific reports, vol. 6, p. 31110, 2016.

R. H. Sanatgar, C. Campagne, and V. Nierstrasz, "Investigation of the adhesion properties of direct 3d printing of polymers and nanocomposites on textiles: Effect of fdm printing process parameters," Applied Surface Science, vol. 403, pp. 551-563, 2017.

R. Maccurdy, R. Katzschmann, Y. Kim, and D. Rus, "Printable hydraulics: A method for fabricating robots by 3d co-printing solids and liquids," in 2016 IEEE International Conference on Robotics and Automation (ICRA). IEEE, 2016, pp. 3878-3885.

R. Singh, "Process capability study of polyjet printing for plastic components," Journal of mechanical science and technology, vol. 25, No. 4, pp. 1011-1015, 2011.

R. V. Aroca, C. E. Ventura, I. De Mello, and T. F. Pazelli, "Sequential additive manufacturing: automatic manipulation pf 3d printed parts," Rapid Prototyping Journal, 2017.

S. C. Ligon, R. Liska, J. Stampfl, M. Gurr, and R. Mulhaupt, "Polymers for 3d printing and customized additive manufacturing," Chemical reviews, vol. 117, No. 15, p. 10 212-10 290, 2017.

S. Felton, M. Tolley, E. Demaine, D. Rus, and R. Wood, "A method for building self-folding machines," Science, vol. 345, No. 6197, pp. 644-646, 2014.

S. Katakura, Y. Kuroki, and K. Watanabe, "A 3d printer head as a robotic manipulator," in Proceedings of the 32nd Annual ACM Symposium on User Interface Software and Technology, 2019, pp. 535-548.

S. Lensgraf and R. R. Mettu, "Beyond layers: A 3d-aware toolpath algorithm for fused filament fabrication," in 2016 IEEE International Conference on Robotics and Automation (ICRA). IEEE, 2016, pp. 3625-3631.

S. Nelaturi, M. Behandish, A. M. Mirzendehdel, and J. de Kleer, "Automatic support removal for additive manufacturing post processing," Computer-Aided Design, vol. 115, pp. 135-146, 2019.

S. T. Ly and J. Y. Kim, "4d printing-fused deposition modeling printing with thermal-responsive shape memory polymers," International Journal of Precision Engineering and Manufacturing—Green Technology, vol. 4, No. 3, pp. 267-272, 2017.

S. Tibbits, "4d printing: multi-material shape change," Architectural Design, vol. 84, No. 1, pp. 116-121, 2014.

T. D. Ngo, A. Kashani, G. Imbalzano, K. T. Nguyen, and D. Hui, "Additive manufacturing (3d printing): A review of materials, methods, applications and challenges," Composites Part B: Engineering, vol. 143, pp. 172-196, 2018.

T. Gotzelmann, L. Branz, C. Heidenreich, and M. Otto, "A personal computer-based approach for 3d printing accessible to blind people," in Proceedings of the 10th International Conference on PErvasive Technologies Related to Assistive Environments, 2017, pp. 1-4.

T. Heikkinen, R. Stolt, and F. Elgh, "Incorporating design for additive manufacturing in multidisciplinary design automation-challenges identified," Computer-Aided Design and Applications, vol. 17, No. 5, pp. 936-947, 2020.

V. E. Kuznetsov, A. N. Solonin, O. D. Urzhumtsev, R. Schilling, and A. G. Tavitov, "Strength of pla components fabricated with fused deposition technology using a desktop 3d printer as a function of geometrical parameters of the process," Polymers, vol. 10, No. 3, p. 313, 2018.

X. Kuang, D. J. Roach, J. Wu, C. M. Hamel, Z. Ding, T. Wang, M. L. Dunn, and H. J. Qi, "Advances in 4d printing: Materials and applications," Advanced Functional Materials, vol. 29, No. 2, p. 1805290, 2019.

Y. Y. C. Choong, S. Maleksaeedi, H. Eng, J. Wei, and P.-C. Su, "4d printing of high performance shape memory polymer using stereolithography," Materials & Design, vol. 126, pp. 219-225, 2017.

Y. Zhou, W. M. Huang, S. F. Kang, X. L. Wu, H. B. Lu, J. Fu, and H. Cui, "From 3d to 4d printing: approaches and typical applications," Journal of Mechanical Science and Technology, vol. 29, No. 10, pp. 4281-4288, 2015.

Z. X. Khoo, J. E. M. Teoh, Y. Liu, C. K. Chua, S. Yang, J. An, K. F. Leong, and W. Y. Yeong, "3d printing of smart materials: A review on recent progresses in 4d printing," Virtual and Physical Prototyping, vol. 10, No. 3, pp. 103-122, 2015.

A. B. Baker, S. R. Bates, T. M. Llewellyn-Jones, L. P. Valori, M. P. Dicker, and R. S. Trask, "4d printing with robust thermoplastic polyurethane hydrogel-elastomer trilayers," Materials & Design, vol. 163, p. 107544, 2019.

A. Nycz, M. Noakes, and M. Cader, "Additive manufacturing-a new challenge for automation and robotics," in Conference on Automation. Springer, 2018, pp. 3-13.

S.F. Costa, F.M. Duarte and J.A. Covas, "Estimation of filament temperature and adhesion development infused deposition techniques" Journal of Materials Processing Technology 245 (2017) 167-179.

A. R. Rajkumar and K. Shanmugam, "Additive manufacturing-enabled shape transformations via fff 4d printing," Journal of Materials Research, vol. 33, No. 24, pp. 4362-4376, 2018.

A. S. Gladman, E. A. Matsumoto, R. G. Nuzzo, L. Mahadevan, and J. A. Lewis, "Biomimetic 4d printing," Nature materials, vol. 15, No. 4, p. 413, 2016.

A. T. Gaynor and J. K. Guest, "Topology optimization considering overhang constraints: Eliminating sacrificial support material in additive manufacturing through design," Structural and Multidisciplinary Optimization, vol. 54, No. 5, pp. 1157-1172, 2016.

A. Wiberg, Towards Design Automation for Additive Manufacturing: A Multidisciplinary Optimization approach. Linkoping University Electronic Press, 2019, vol. 1854.

B. Bhushan and M. Caspers, "An overview of additive manufacturing (3d printing) for microfabrication," Microsystem Technologies, vol. 23, No. 4, pp. 1117-1124, 2017.

B. Evans, "A world of 3d printers," in Practical 3D Printers. Springer, 2012, pp. 1-26.

D. Besnea, C. Rizescu, D. Rizescu, D. Comeaga, R. Ciobanu, and E. Moraru, "Study of deflection behavior of 3d printed leaf springs," in IOP Conference Series: Materials Science.

D. I. Wimpenny, P. M. Pandey, and L. J. Kumar, Advances in 3D printing & additive manufacturing technologies. Springer, 2017.

D. Kokkinis, M. Schaffner, and A. R. Studart, "Multimaterial magnetically assisted 3d printing of composite materials," Nature communications, vol. 6, p. 8643, 2015.

E. Macdonald, R. Salas, D. Espalin, M. Perez, E. Aguilera, D. Muse, and R. B. Wicker, "3d printing for the rapid prototyping of structural electronics," IEEE access, vol. 2, pp. 234-242, 2014.

E. Pei, "4d printing: dawn of an emerging technology cycle," Assembly Automation, vol. 34, No. 4, pp. 310-314, 2014.

(56) References Cited

OTHER PUBLICATIONS

E. Serrano, L. Vitorino, and H. A. Almeida, "Impact of additive technologies in the health sector for 2030," in 2019 IEEE 6th Portuguese Meeting on Bioengineering (Enbeng). IEEE, 2019, pp. 1-4.
F. H. Froes and R. Boyer, Additive Manufacturing for the Aerospace Industry. Elsevier, 2019.
F. Momeni, X. Liu, J. Ni et al., "A review of 4d printing," Materials & design, vol. 122, pp. 42-79, 2017.
F. R. Ishengoma and A. B. Mtaho, "3d printing: developing countries perspectives," arXiv preprint arXiv: 1410.5349, 2014.
G. Hu, A. Damanpack, M. Bodaghi, and W. Liao, "Increasing dimension of structures by 4d printing shape memory polymers via fused deposition modeling," Smart Materials and Structures, vol. 26, No. 12, p. 125023, 2017.
H. N. Zadeh, T. Huber, F. Dixon, C. Fee, and D. Clucas, "Fabrication of cellulose hydrogel objects through 3d printed sacrificial molds," in International Conference of Progress in Digital and Physical Manufacturing. Springer, 2019, pp. 265-270.
J. C. Najmon, S. Raeisi, and A. Tovar, "Review of additive manufacturing technologies and applications in the aerospace industry," in Additive manufacturing for the aerospace industry. Elsevier, 2019, pp. 7-31.
J. E. Huber, N. A. Fleck, and M. F. Ashby, "The selection of mechanical actuators based on performance indices," vol. 453. The Royal Society, 1997.
J. Jiang, J. Stringer, X. Xu, and p. Zheng, "A benchmarking part for evaluating and comparing support structures of additive manufacturing," in 3rd International Conference on Progress in Additive Manufacturing (Pro-AM 2018), 2018, pp. 196-202.
J. Jiang, X. Xu, and J. Stringer, "Support structures for additive manufacturing: a review," Journal of Manufacturing and Materials Processing, vol. 2, No. 4, p. 64, 2018.
J. R. C. Dizon, A. H. Espera Jr, Q. Chen, and R. C. Advincula, "Mechanical characterization of 3d-printed polymers," Additive Manufacturing, vol. 20, pp. 44-67, 2018.
J. Vanek, J. A. G. Galicia, and B. Benes, "Clever support: Efficient support structure generation for digital fabrication," in Computer graphics forum, vol. 33, No. 5. Wiley Online Library, 2014, pp. 117-125.
K. Thrimurthulu, p. M. Pandey, and N. V. Reddy, "Optimum part deposition orientation in fused deposition modeling," International Journal of Machine Tools and Manufacture, vol. 44, No. 6, pp. 585-594, 2004.
L. J. Stiltner, A. M. Elliott, and C. B. Williams, "A method for creating actuated joints via fiber embedding in a polyjet 3d printing process," in International Solid Freeform Fabrication Symposium, vol. 22, 2011, pp. 583-592.
L. Meng, W. Zhang, D. Quan, G. Shi, L. Tang, Y. Hou, p. Breitkopf, J. Zhu, and T. Gao, "From topology optimization design to additive manufacturing: Today's success and tomorrow's roadmap," Archives of Computational Methods in Engineering, pp. 1-26, 2019.
M. Attaran, "The rise of 3-d printing: The advantages of additive manufacturing over traditional manufacturing," Business Horizons, vol. 60, No. 5, pp. 677-688, 2017.
M. Bodaghi, A. Damanpack, and W. Liao, "Triple shape memory polymers by 4d printing," Smart Materials and Structures, vol. 27, No. 6, p. 065010, 2018.
M. Cotteleer and J. Joyce, "3d opportunity: Additive manufacturing paths to performance, innovation, and growth," Deloitte Review, vol. 14, pp. 5-19, 2014.
M. D. Dickey, "Hydrogel composites: Shaped after print," Nature materials, vol. 15, No. 4, p. 379, 2016.
M. Delic, D. R. Eyers, and J. Mikulic, "Additive manufacturing: empirical evidence for supply chain integration and performance from the automotive industry," Supply Chain Management: An International Journal, 2019.
M. E. Prendergast and J. A. Burdick, "Recent advances in enabling technologies in 3d printing for precision medicine," Advanced Materials, p. 1902516, 2019.
M. Fernandez-Vicente, M. Canyada, and A. Conejero, "Identifying limitations for design for manufacturing with desktop fff 3d printers, "International Journal of Rapid Manufacturing, vol. 5, No. 1, pp. 116-128, 2015.
M. Jimenez, L. Romero, I. A. Dominguez, M. d. M. Espinosa, and M. Dominguez, "Additive manufacturing technologies: An overview about 3d printing methods and future prospects," Complexity, vol. 2019, 2019.
M. K. Niaki, S. A. Torabi, and F. Nonino, "Why manufacturers adopt additive manufacturing technologies: The role of sustainability," Journal of cleaner production, vol. 222, pp. 381-392, 2019.
M. Nadgorny and A. Ameli, "Functional polymers and nanocomposites for 3d printing of smart structures and devices," ACS applied materials & interfaces, vol. 10, No. 21, p. 17 489-17 507, 2018.
M. Ramola, V. Yadav, and R. Jain, "On the adoption of additive manufacturing in healthcare: a literature review," Journal of Manufacturing Technology Management, 2019.
M. W. Barclift and C. B. Williams, "Examining variability in the mechanical properties of parts manufactured via polyjet direct 3d printing" in International Solid Freeform Fabrication Symposium. University of Texas at Austin Austin, Texas, 2012, pp. 6-8.
M. Wehner, R. L. Truby, D. J. Fitzgerald, B. Mosadegh, G. M. Whitesides, J. A. Lewis, and R. J. Wood, "An integrated design and fabrication strategy for entirely soft, autonomous robots," Nature, vol. 536, No. 7617, p. 451, 2016.
Mazhari, A et al., "Printing and Programming of In-Situ Actuators," 2020 IEEE/ASME International Conference on Advanced Intelligent Mechatronics (AIM), Boston, Ma, USA, 2020, pp. 445-450, 9 p.
Mazhari, A., et al., A Method for High Throughput Additive Manufacturing Through Automated Deployment, Manuscript submitted for publication to Ra-L and Iros, 2020, 6 Pages.
N. A. Meisel, A. M. Elliott, and C. B. Williams, "A procedure for creating actuated joints via embedding shape memory alloys in polyjet 3d printing," Journal of intelligent material systems and structures, vol. 26, No. 12, pp. 1498-1512, 2015.
N. Grimmelsmann, M. Kreuziger, M. Korger, H. Meissner, and A. Ehrmann, "Adhesion of 3d printed material on textile substrates, "Rapid Prototyping Journal, vol. 24, No. 1, pp. 166-170, 2018.
N. Li, S. Huang, G. Zhang, R. Qin, W. Liu, H. Xiong, G. Shi, and J. Blackburn, "Progress in additive manufacturing on new materials: A review," Journal of Materials Science & Technology, vol. 35, No. 2, pp. 242-269, 2019.
N. Meisel, A. Gaynor, C. Williams, and J. Guest, "Multiple-materialtopology optimization of compliant mechanisms created via polyjet 3d printing," in 24th Annual international solid freeform fabrication symposium an additive manufacturing conference, 2013, p. 28.
O. Gomis-Bellmunt and L. Flavio Campanile, Design Rules for Actuators in Active Mechanical Systems. Springer, 2010.

* cited by examiner

AUGMENTED MANUFACTURING BY EMBEDDING AUTONOMOUS INTERACTIONS BETWEEN MANUFACTURED COMPONENTS AND MANUFACTURING MACHINES

ORIGIN OF THE INVENTION

The invention described herein was made in the performance of work under a NASA contract and by (an) employee(s) of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor has elected not to retain title.

TECHNICAL FIELD

The invention relates to additive manufacturing, such as performed by 3D-printers.

BACKGROUND

Additive manufacturing is a specific form of computer-numerically-controlled (CNC) manufacturing that has gained widespread acceptance, and in some fields, has become indispensable. In its basic form, the additive manufacturing device, a 3D printer, converts feedstock in the form of a filament, for example of polylactic acid (PLA), into a three-dimensional component by melting the filament and depositing it in built-up layers to form the desired object. The deposition head of the device is mechanically driven in the required pattern as instructed by computer code, running on computing platforms such as the open-source RepRap i3 Fused Filament Fabrication (FFF) platform. During deposition, the object is supported on a build-plate which is then manually cleared of the object upon completion.

Figure 1:
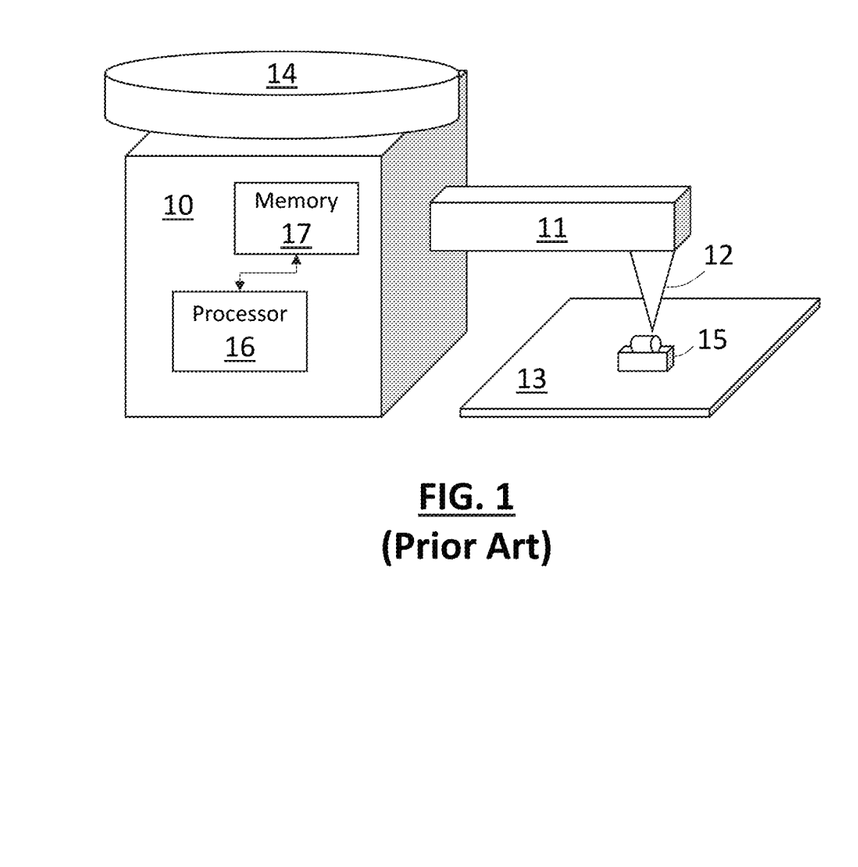
FIG. 1 is a schematic diagram of a conventional off-the-shelf additive manufacturing machine.

FIG. 1 is a schematic diagram of a conventional off-the-shelf additive manufacturing machine 10, which is shown to include a gantry 11 that movably supports a deposition head or nozzle 12 above a build-plate 13. The deposition head 12 deposits suitably conditioned material of feedstock 14 onto build-plate 13 as it moves in a prescribed pattern, thereby additively building object 15. Operation is controlled by a processor 16 which executes code, stored in a memory 17, that governs, for example, the motion of gantry 11 and nozzle 12, the rate of feed of the feedstock, temperature and other parameters.

Figure 2:
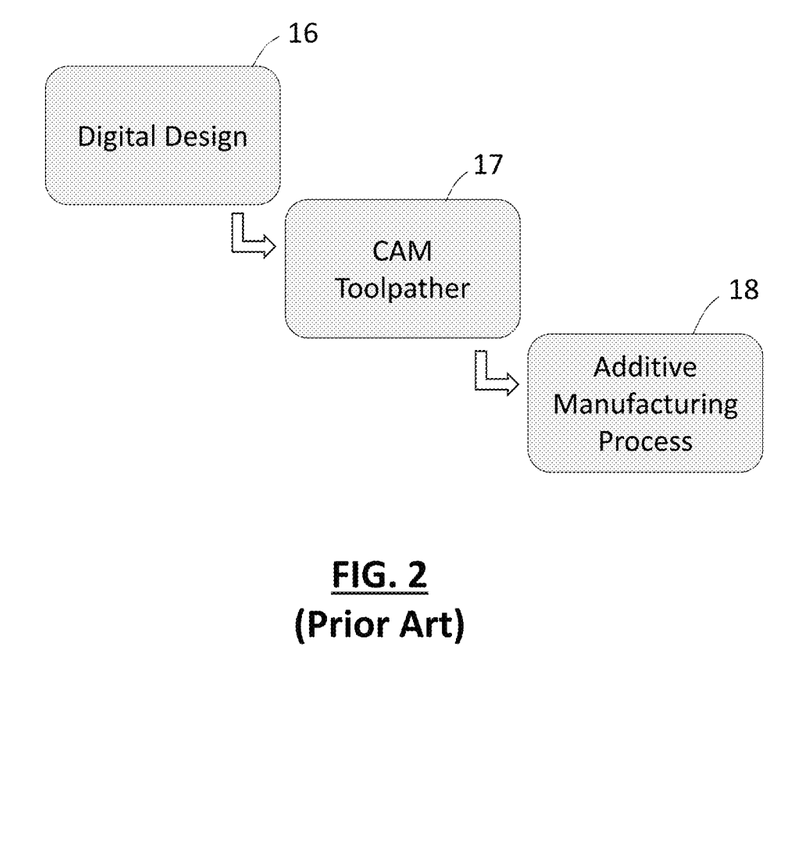
FIG. 2 is a block diagram of the workflow of an additive manufacturing machine.

FIG. 2 is a block diagram of the workflow of additive manufacturing machine 10. The workflow comprises the digital design 16 of the object, as well as the CAM toolpather code 17 that is executed by the machine 10 to additively manufacture the object, at 18.

SUMMARY

In accordance with certain embodiments, methods and systems are provided to allow for the high-volume production and autonomous actuation of additively manufactured components through physical interfacing of printed components with one-another and with the machine that manufactured them, and autonomous testing of the additively manufactured parts.

In accordance with certain embodiments, methods and systems are provided to significantly increase the throughput of additively manufactured components by automating their removal from the build platform without the need for additional hardware. By embedding into digitally defined manufacturing processes methods to fabricate in situ onto the build platform an actuator tool that stores and releases mechanical energy through linear springs, manufactured objects may be automatically deployed off the machine they were additively manufactured on. Some embodiments of the invention use the deposition head as a robotic manipulator of an actuator tool to bend, cock, and release the linear spring to strike the target manufactured object and move it off the build platform.

Methods and systems are additionally provided for embedding into the additive manufacturing processes additional dimensions of information or functionality into additively manufactured components as a function of the 3D-printing process. Embodiments enable providing the additive manufacturing process with physical assessments through self-contained post-manufacturing assessment of digital manufacturing toolpaths. By embedding physical additive-process-specific interactions into the manufacturing toolpath of a component, the instructions and code for the additive manufacturing process provide the ability for dynamic interaction of the system with the additive manufacturing environment. Additionally, multiple objects may be processed to simultaneously interact with both the manufacturing environment and similarly fabricated components for an increased complexity of interactions and a significantly expanded range of outcomes.

By digitally altering the computer-aided manufacturing (CAM) processes for manufactured parts to automatically physically actuate a component through embedding the actuation instructions for the machine's interaction with the component into a component's build process, embodiments described herein significantly expand the number of possible physical outcomes and, in certain embodiments, the number of realizable tests for the manufactured components. Additional parameters allow a designer to tailor the build process to autonomously actuate a component that will realize a specific velocity, coefficient of lift, natural frequency, dampening coefficient, and other parameters, and more generally, to act as a repository for high energy storage (i.e., potential energy stored in a loaded spring) that can be deployed (i.e., releasing the spring to impact an object) as needed. The added dimensions of information significantly expand the number of possible design parameters and tests embedded and realized through the manufacturing process.

The ability to embed dimensions of digital information into the manufacturing process is enabled through computer-numerically-controlled (CNC) machines. Including additional dimensions of information in a system as disclosed herein allows for an increased span, or reachability, of solutions for a given set of parameters. The disclosed physical actuating of an object is an example of designing a component with the embedded dimensions of information to specifically interact with and autonomously actuate the additional information through the manufacturing platform; this in turn allows the manufactured components to interact with each-other and/or their environment while simultaneously automating the post-processing stage of additive manufacturing, even in single-gantry platforms.

In some embodiments, a digital design is modified for a desired actuation of a component that was fabricated within the build volume. The manufacturing process-specific tool pathing software generates a code which includes autonomous cyber-physical interfacing. When the software is executed, the additive manufacturing process takes place, and additional instructions of physical interfacing cause fabricated objects to dynamically interact, for example, by storage and release of high energy. Codes for manufacturing traditional components can be modified to include the autonomous cyber-physical interfacing.

One example described herein is of a kinematic interaction between two manufactured objects on the build platform. Examples of additional parameters of information contained in this demonstration are the range of velocities and spring constants that the manufactured objects will exhibit through build-plate interactions.

In certain embodiments, a combination of two procedures enable the autonomous cyber-physical interaction of 3D-printed parts on the build-tray for providing automated high-volume production and testing of additively manufactured components. The first procedure provides for the physical interaction of a 3D-printed object with its environment, and the second procedure provides for the autonomy of such interactions. The combined procedures allow for the high-volume production and autonomous actuation and testing of additively manufactured parts through physical interfacing of printed components with one another and the machine that manufactured them, in one example. These digital modifications allow for the automated embedding and physical validation of additional dimensions of information through the manufacturing process.

Applications of the technology disclosed herein include a platform and testbed for digitally embedding additional dimensions of information into currently existing computer-aided manufacturing (CAM) systems. CAM systems typically include software that generates toolpaths for the machine for use by the machine to manufacture or build a component. CAM system further include systems that convert the toolpaths into instructions for moving a machine's parts, such as a deposition head or nozzle of a 3D printer. Industry may leverage the technology with a multitude of processes for creating novel interactions that may have commercial applications. The technology provides the ability to conduct significantly more experiments than otherwise possible while utilizing current systems, without any physical modifications to the manufacturing machines. The ability to digitally transfer this capability, for example, wirelessly over vast distances, is very powerful and requires minimal investment to adopt. Industrial applications may benefit heavily from the ability to autonomously actuate and eject a high volume of manufactured components from additive manufacturing platforms by interactions between a manufactured ancillary component and the machine that manufactured it. For example, the ability for an object to 'fly off of the machine that made it' essentially enables automated clearing of the processed build volume. The increased throughput through the automation of clearing a machine without the need for additional robotic manipulators is economically appealing. This is especially relevant as industry continues to adopt a larger percentage of additive manufacturing as part of its workflow, although it should be noted that other types of CNC manufacturing, and not only additive manufacturing, can benefit from the disclosed embodiments.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DETAILED DESCRIPTION

Example embodiments are described herein in the context of embedding numerous dimensions of information in manufacturing to provide for adding autonomy characteristics to manufactured components and processes. The following description is illustrative only and is not intended to be in any way limiting. Other embodiments will readily suggest themselves to those of ordinary skill in the art having the benefit of this disclosure. Reference will be made in detail to implementations of the example embodiments as illustrated in the accompanying drawings. The same reference indicators will be used to the extent possible throughout the drawings and the following description to refer to the same or like items.

In the description of example embodiments that follows, references to "one embodiment," "an embodiment," "an example embodiment," "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. The term "exemplary" when used herein means "serving as an example, instance or illustration." Any embodiment described herein as "exemplary" is not necessarily to be construed as preferred or advantageous over other embodiments.

In the interest of clarity, not all of the routine features of the implementations described herein are shown and described. It will be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. Devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Herein, reference to a computer-readable or machine-readable storage medium encompasses one or more non-transitory, tangible storage media possessing structure. As an example and not by way of limitation, a computer-readable storage medium may include a semiconductor-based circuit or device or other integrated circuit (IC) (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, nonvolatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Figure 3:
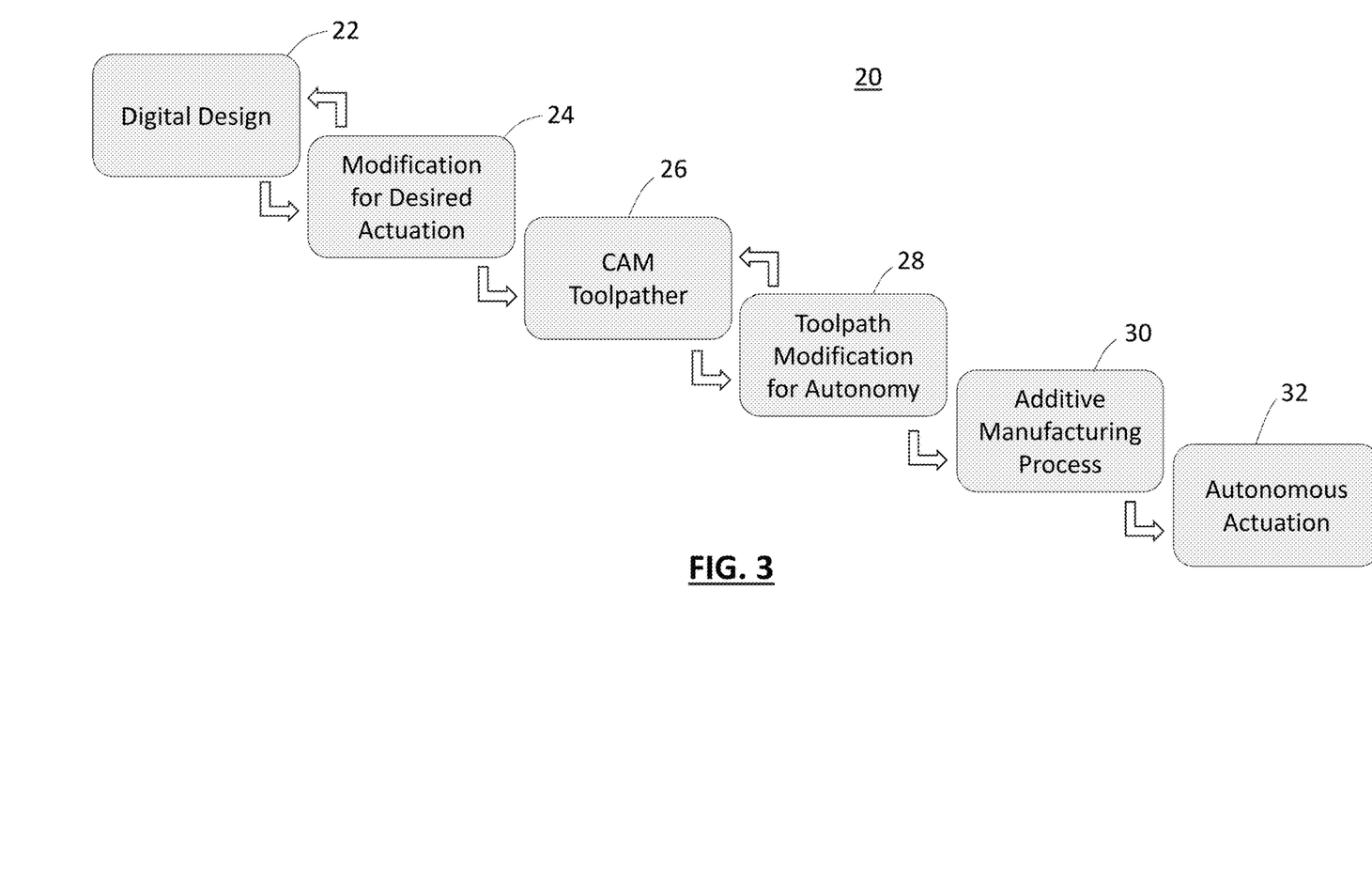
FIG. 3 is a block diagram of the workflow for augmenting the functionality of an additive manufacturing machine in accordance with certain embodiments.

FIG. 3 is a block diagram of the workflow 20 for augmenting the functionality of an additive manufacturing machine by embedding bed and autonomously actuating numerous dimensions of information in manufacturing in accordance with certain embodiments. While described in terms of additive manufacturing, the workflow 20 is not so limited, but is more widely applicable to other forms of manufacturing and more generally CNC machines. Additive manufacturing platforms such as those used in FFF, or in Fused Deposition Modeling (FDM), may be particularly well-suited to applications described herein as they provide the ability to interact with relatively elastic thermoplastic materials, leveraging a deposition head disposed on a gantry and driven by a series of independent stepper motors. This provides a highly controllable process, which would allow for the selective programming of interactions through gantry-code (g-code) stored in memory and executed by a processor.

In FIG. 3, an initial digital design of an object is shown at block 22, followed by a modification of the design to include autonomy information or an autonomy characteristic, as shown at block 24. The two arrows between these blocks show the relationship between the original digital design and the modification as one that may be derived from the other. More details of the design modification are provided below. In some embodiments, the autonomy characteristic may include one or more of a physical feature of the component to be manufactured, for example the addition of manufacturing an ancillary object such as an actuator that can interact with or affect the component. In some embodiments, it can include a behavioral feature such as instructions to the manufacturing machine to interact with the component and/or ancillary object, for example, to cause component to receive stored energy, for example, by being struck with the ancillary object to propel its motion, where the ancillary object had been stored with energy by being bent back by the deposition head.

At blocks 26 and 28, a CAM (computer-aided-manufacturing) toolpath corresponding to the modification 24 is created. In certain embodiments, the CAM toolpath consists of processor-executed code stored in memory and used to guide the machine, for example, a 3D printer that fabricates the object as it deposits material in the required pattern. As the two arrows indicate, the modified toolpath at 28 may be derived from an original toolpath at block 26. The toolpath is modified to add autonomy characteristics to the manufactured object or the manufacturing process. At block 30, the manufacturing process is commenced based on the modified toolpath, and the object or objects are built. At block 32, the toolpath instructs the machine to interact with the object to perform an autonomous task in implementation of the autonomy characteristic.

Figures 4, 4A:
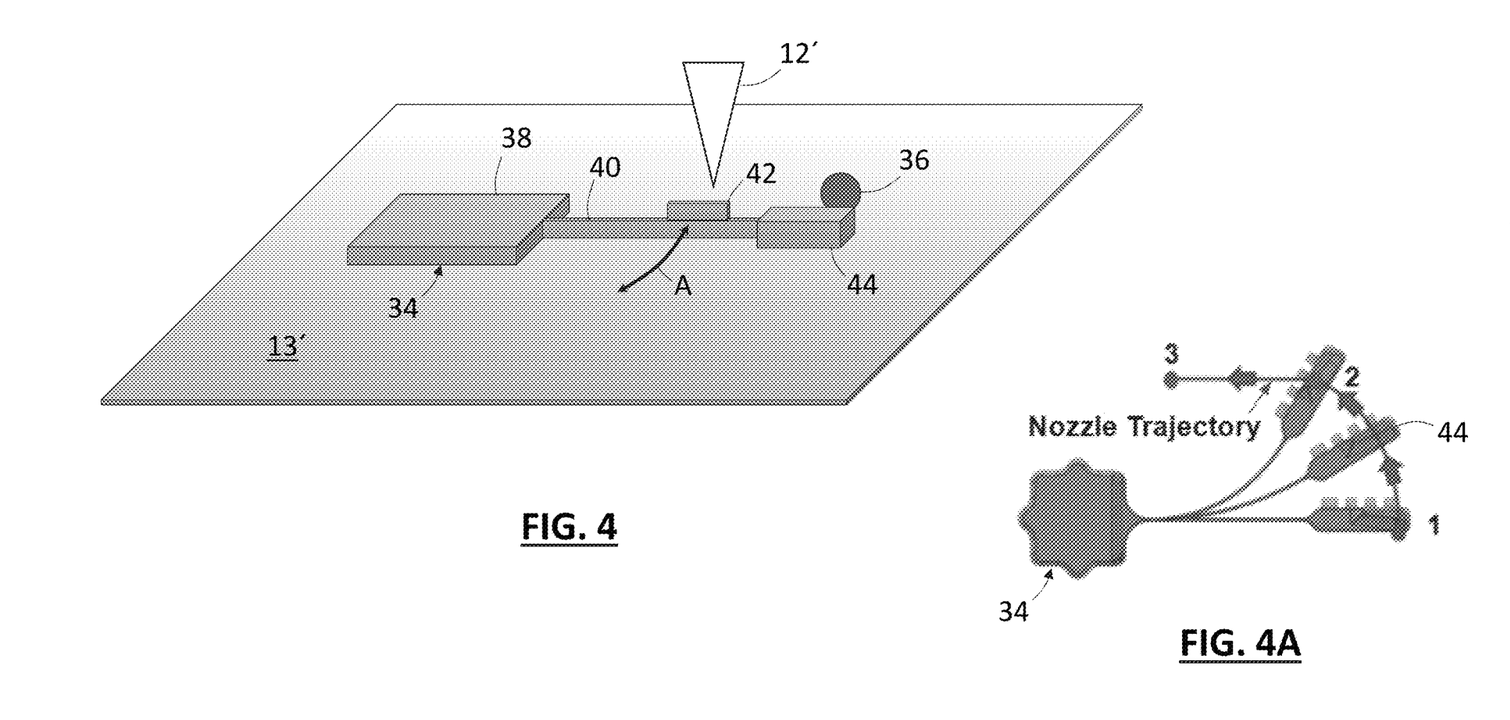
FIG. 4 shows additively manufactured objects in an exemplary application of the principles of the workflow above.
FIG. 4A shows a more detailed view of the path and movement of a deposition head of an additive manufacturing machine loading an ancillary component with high energy, in accordance with certain embodiments.

FIG. 4 shows a configuration of additively manufactured objects in an exemplary application of the principles of the workflow 20 described above. The additively manufactured objects in this example comprise an ancillary object 34, which is a cantilever spring that functions as an actuator, and a component 36. In one example application, the goal may be to build multiple components 36 sequentially on the same area of the build platform without human intervention, without modifying an off-the-shelf additive manufacturing machine and without assistance from an operator or additional tooling or devices. This is particularly appealing in spacecraft applications, whereby modification and customization of an onboard additive manufacturing machine would be prohibitive in weight, volume and other constraints, or it may simply be unanticipated at the time of initial spacecraft provisioning, but later arise as a mission critical need. Instead, and with reference to FIG. 3, the digital design 22 of the component 36 is modified (at block 24) to include building and using an actuator 34. The modified digital design (and potentially component 36) embodies and conveys information in the form of an autonomy characteristic, prescribing its desired behavior and functionality. In this specific example, the digital design includes instructions for fabricating an ancillary object 34, a cantilever spring, for successively ejecting the components 36 from the build-plate 13 after a component 36 is fabricated, and it includes code for implementing the ejection maneuver through interaction between the additive manufacturing machine and spring.

At blocks 26 and 28, a CAM toolpath defining the code to be executed in the manufacturing of the actuator 34 and component 36 is devised. The two arrows between these blocks show the relationship between the original toolpath (of component 36) and the modification (to include manufacturing and using the actuator 34, and possibly to modify the component 36 as well for optimized interaction with actuator 34) as one that may be derived from the other. In certain embodiments the modification at block 28 is to the tool pathing software, with a post-script that integrates the numerics required for autonomy. The input and output of block 28 is a modified toolpath, for example a gantry-code file (.gcode). In the spacecraft application, the modified CAM toolpath 28, as well as other blocks in the workflow, can be delivered from the terrestrial station to the spacecraft via radio transmission for example.

At block 30, the additive manufacturing is effected, for example, beginning with the simultaneous build of actuator 34 and a first instantiation of component 36, using the modified tool pathing of block 28. At block 32, the autonomous behavior is initiated as detailed below.

As mentioned above, the modified digital design 24 of actuator 34 (and component 36) embodies information prescribing its functionality and imparting the autonomous characteristic. The information can relate to shape, material, density, distribution, elasticity, size, weight, momentum, mechanical features, and so on, for both the actuator 34 and component 36. The information can also relate to the desired behavior of these objects, for example the distance to which the component 36 is to be propelled by actuator 34, the number of strokes the actuator is expected to operate before fatigue and replacement, and so on.

Actuator 34 comprises base 38, lever arm 40, paddle 42, and tab 44, all of which may be defined in the modified design 24 (FIG. 3). Base 38 provides inertia and stability, and sufficient adherence to the build-plate 13' for proper operation and repeated deployment. It is configured to absorb the angular momentum generated by the actuator, providing a counter-moment to absorb the energy generated by the spring. Arm 40 provides force, by storing and releasing energy through its elasticity, and paddle 42 provides contact and an increased moment of inertia for imparting sufficient force to the component 36 and transferring energy thereto. Tab 42 is a mechanical feature intended to interact with deposition head 12' of the additive manufacturing machine (see FIG. 1 for reference), in furtherance of the autonomous deployment depicted in block 32 (FIG. 3). Specifically, after completion of manufacture of actuator 34 and component 36, deposition head 12' is brought into contact with tab 42 and translates it along the direction of arrow A to cock actuator 34, and then release it for impact with component 36 with sufficient force to propel it off build-plate 13' in a predictable trajectory for landing at a suitable location, for example a collection bin (not shown). FIG. 4A shows a more detailed view of the path of the deposition head, or nozzle, in its passage through points 1-3.

The autonomous deployment of actuator 34 in conjunction with the deposition head 12' clears build-plate 13' for the deposition of another component 36, which is similarly ejected by actuator 34, and the operation can be repeated multiple times as desired. In certain embodiments, the tab 42 is embedded as a notch of the machine's minimum feature size as the last layer of fabrication, so that the deposition head 12' is driven to finish at the same coordinate location. From there, a translation code is executed in the toolpath, moving the deposition head 12' from the finishing point to the front of the tab 42. A traced set of coordinates are then referenced from the toolpath, moving the deposition head 12' and consequently the lever arm 40 along a curved sequence, causing deflection of the spring. The head 12' is programmed to then slide along the tab 42 once it has reached full spring-deflection, releasing the lever arm 40 and the stored mechanical energy in the spring to subsequently physically impact and strike the component 30 off of the build-platform 13'.

In certain embodiments, to sequentially deploy objects such as component 36 after they are manufactured, the g-code for the fabrication of a new object can either be pre-programmed into the code such that after deployment by the actuator 34, the next line of code is to start depositing thermoplastic onto the build-plate 13' for the fabrication of the next component 36; or it can be re-programmed into the platform after a deployment by toolpathing and sending new g-code to the additive manufacturing machine. This gives the user the ability to either pre-program the repeatable, automated sequential fabrication and removal of a certain set of desired components, or wait for the command to start a new object after each deployment. The latter configuration introduces the possibility of automated iterative testing configurations, fabricating a set of differing prototypes manufactured sequentially, such as detailed further below.

Figure 5:
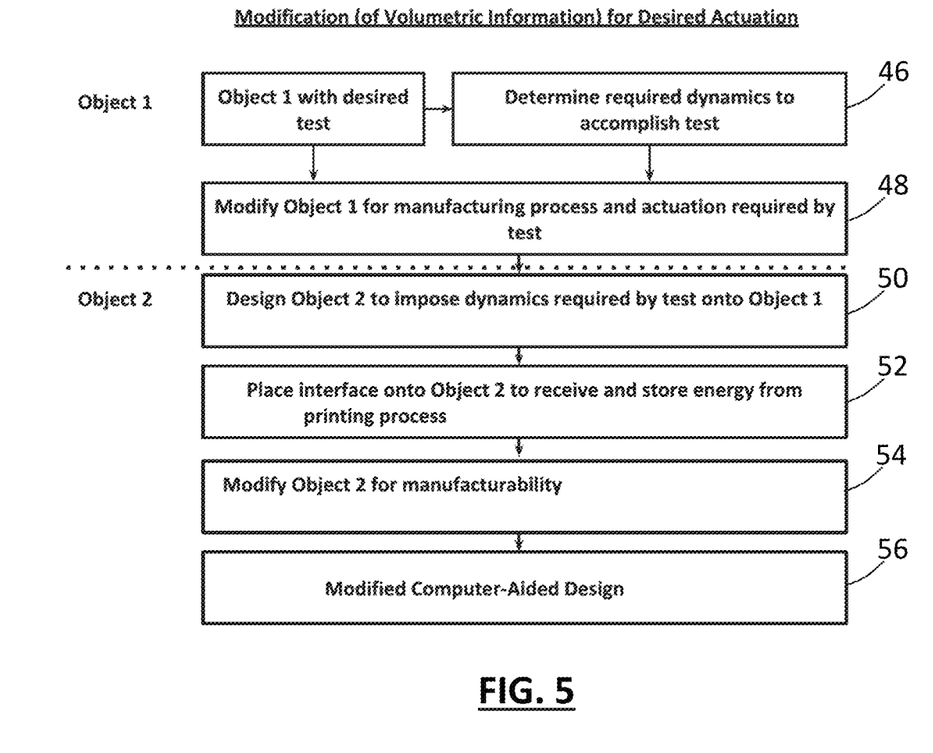
FIG. 5 is a flow diagram showing some details of design modification in accordance with certain embodiments.

Applying the specific additively manufactured component 36 and actuator 34 example to the block diagram of the work flow 20 of FIG. 3, design modification block 24 may thus involve several steps as further detailed in FIG. 5. The design modification builds an autonomous characteristic into the manufactured object, for example, the ability for the manufactured object to be employed in the process to perform a function, where the design modification includes a physical feature (actuator 34) and a kinematic feature (i.e., using the movement of the deposition head 12 to store potential energy in the spring by cocking and bending the actuator arm 40 and to transfer the energy to the component 36 by releasing the actuator).

The process of FIG. 5 begins at step 46, where the dynamics required to achieve the autonomous operation (i.e., ejection of the component 36, or Object 1, from the build plate 13') are determined. At step 48, a determination is made whether the Object 1 needs to be modified, and that modification is incorporated into the design. Further, in the instant example it is determined that an actuator 34 (Object 2) is required to achieve the desired result, and a design of the actuator is then created, at step 50. At step 52, an Object 2 interface (tab 44) for the exchange of energy between the manufacturing machine, Object 1 and Object 2 is conceived. At step 54, Object 2 design is modified for manufacturability. At 56, the completed modified design (24, FIG. 3) is realized.

Figure 6:
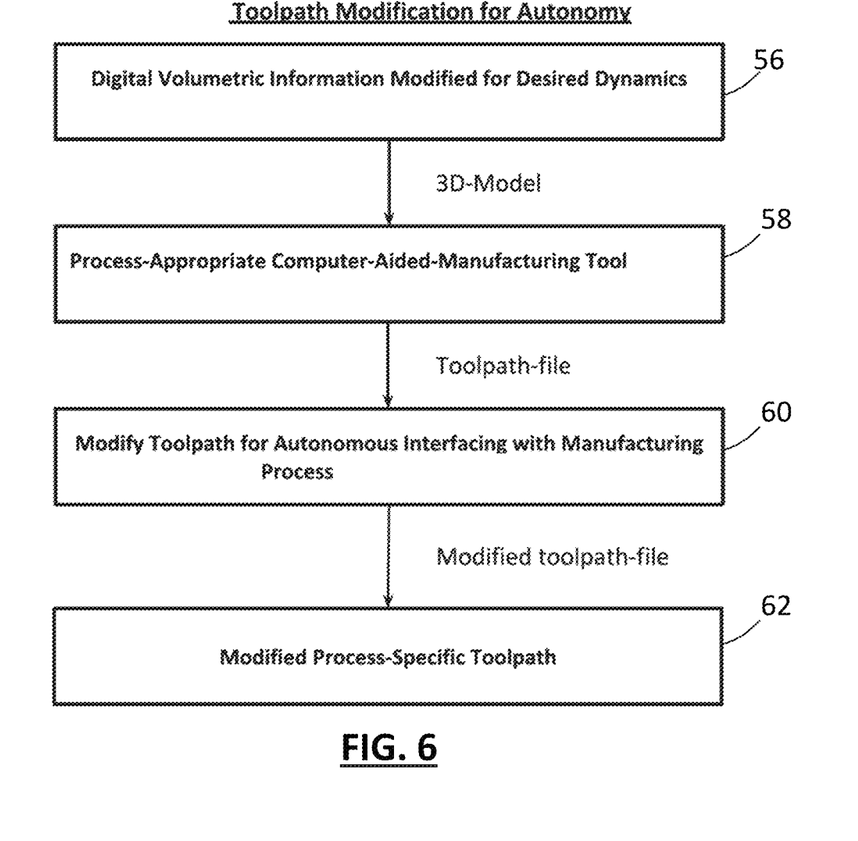
FIG. 6 is a flow diagram showing some details of toolpath or code modification in accordance with certain embodiments.

Applying the specific additively manufactured component 36 and actuator 34 example to the block diagram of the work flow 20 of FIG. 3, toolpath or code modification block 28 to build an autonomous characteristic into the manufactured object with may thus involve several steps as further detailed in FIG. 6. At step 58, the desired dynamics are used to modify the digital volumetric information for the objects and generate a 3D model. At step 60, a process-appropriate computer-aided manufacturing tool as a toolpath file is created. At 62, the toolpath for autonomous interfacing with the manufacturing process is created. At 64, the modified process-specific toolpath results.

It should be noted that an actuator can be manipulated to store high energy by additive machines using dynamic components other than a deposition nozzle. In fact, Table A below lists several types of additive machines with moving components that may be analogously deployed.

TABLE A

| Name | Additive Process | Materials (Ordered by Commonality) | Typically Moving Components |
| --- | --- | --- | --- |
| Fused Deposition Modeling | Thermoplastic | Polymers | Extrusion Head, Build Platform |
| Stereolithography | Photosensitive Thermoset | Polymers, Ceramics | Laser, Build Platform, Resurfacing Tool |
| CLIP, Direct Light Projection | Photosensitive Thermoset | Polymers, Ceramics | Build Platform, Resurfacing Tool |
| Polyjet | Photosensitive Thermoset | Polymers | Jetting Head, Build Platform |
| Selective Laser Sintering/Melting, Electron Beam Melting, Laser Powderbed Fusion | Sintering/ Melting | Metals, Polymers, Ceramics | Laser/Electron Beam, Leveling Roller, Powder Platform, Build Platform |
| Colorjet/ Binderjetting | Adhesive Binding | Gypsum, Ceramics, Metals | Jetting Head, Leveling Roller, Powder Platform, Build Platform |

Thus, without human intervention into the manufacturing process, or hardware modification of the manufacturing platform, throughput of the production of multiple components 36 can be significantly increased. Existing off-the-shelf machines and their environments can be readily retrofitted in accordance with certain embodiments, embedding physical information that enables kinematics as a functional extension of the manufacturing platform. By designing to-be-fabricated components with respect to material and manufacturing-specific variables and uniquely utilizing the building process to enable physically embedded information and interaction, the arrangements described herein are able to effectuate objects into new modes autonomously. To change the mode of a fabricated object, autonomy characteristics are embedded in the layer-design to be actuated at a later point in the manufacturing process. For instance, utilizing the gantry on the additive manufacturing platform to deflect the actuator 34 after its fabrication and propel the component 36, enables actuation and deployment of an extra dimension of functionality, in situ.

Moreover, by using a separate actuator 34 to expel the component 36 from the additive manufacturing machine, the component 36 itself need not be modified despite it and the manufacturing machine having gained additional functionality in the form of self-removal of the component from the platform at manufacture. This decoupling of the actuator from the component of interest, while adding functionality to the component and/or manufacturing machine, is an important advantage of the described arrangement, for example, freeing the manufactured component from having to be re-designed to store additional energy (for the self-propulsion for example) or be otherwise modified for the additional functionality. It can also be characterized as a divergence of the parts that are manufactured from the manufacturing machine. Specifically, the machine that manufactured the component 36 does directly interact with the component, but it can interact with the actuator 34 that interacts with the component. Further divergence is also envisioned, whereby one manufactured part may have additional built-in functionality while at the same time being multiple parts removed from direct interaction with the machine that manufactured it.

As mentioned above, in another exemplary application of the principles of the workflow 20 described above, autonomous characteristics can be embedded for iterative testing of manufactured parts or platforms, as well as rapid prototyping. More generally, for iterative testing, the manufacturing machine can be converted into a platform for destructive or non-destructive evaluation, either of parts and materials used in the manufacture, or of the platform itself. Returning to the actuator example, if after a predetermined number of iterations, for instance after a certain number of ejections of components 36, it is discovered that the velocity and distance that the components are traveling are decreasing, then it may be inferred that the actuator 34 is fatiguing and needs to be replaced. If the decrease is due to the use of a different feedstock, it may be inferred that one or more feedstock characteristics, for example elasticity, have changed. In fact, an evaluation of the material, or the manufactured part, can itself be the goal of an application, outside the context of component manufacture. An actuator such as actuator 34 can be manufactured and then repetitively cocked and released in order to detect properties attributable to its design and/or its material, such as elasticity over time and repeated deployment, damping frequency, and so on. It may thus be possible to attach a unique fingerprint to components and materials, or batches of materials, based on their detected properties as they are manufactured by the additive manufacturing machine and used in the manufacturing process. Similarly, rapid prototyping can be performed, with slight modifications of a design being tested with each iteration. All of this can be implemented without modification of the manufacturing machine, but merely of the design and build of its product, using executable code driving the machine, and which code can be delivered from a remote location such as a base station in communication with a spacecraft housing the manufacturing machine. In certain embodiments, the machine itself, and its performance, can be operated to self-diagnose and evaluate in this manner. Further, in certain embodiments, measurement instruments, such as optical cameras or other sensors to detect vibration or natural frequency, or thermal sensors to measure temperature, can be used to further characterize the machine, object or material of interest and detect its properties and behavior.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted based on the foregoing description. This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method for augmenting functionality of an additive manufacturing machine, the method comprising:
   generating a component design having an autonomy characteristic; and
   generating code for the implementation of the autonomy characteristic,
   wherein the additive manufacturing machine is an off-the-shelf additive manufacturing machine and the autonomy characteristic of the component design imparts a functionality to one or more components manufactured by the additive manufacturing machine, wherein the functionality is based on a physical interaction between at least one of the components and the additive manufacturing machine; and
   the functionality comprising actuating the at least one of the components with the additive manufacturing machine, detecting a property of the component as a function of said actuating, and repeating the actuating and detecting over successive iterations to thereby characterize the component, a material of the component, or the additive manufacturing machine.

2. The method of claim 1, wherein the autonomy characteristic includes one or both of a physical attribute and a kinematic attribute.

3. The method of claim 1, wherein the physical interaction includes the additive manufacturing machine interacting with a first component to cause at least a second component of the one or more components to be propelled.

4. The method of claim 3, wherein the propelling is effected using the first component, the first component being a cantilever spring manufactured by the additive manufacturing machine.

5. The method of claim 3, wherein the physical interaction includes the additive manufacturing machine interacting with a first component to cause a plurality of components to be propelled.

6. The method of claim 3, wherein the code for the implementation of the autonomy characteristic includes instructions for a deposition head of the additive manufacturing machine to apply force to a portion of the first component by a movement defined by a kinematic attribute of the autonomy characteristic.

7. The method of claim 6, wherein the code for the implementation of the autonomy characteristic includes instructions for the deposition head to move to release stored potential energy in the first component.

8. The method of claim 1, wherein the additive manufacturing machine is disposed in a spacecraft and the generated code is delivered wirelessly thereto.

9. The method of claim 1, wherein the additive manufacturing machine is a 3D printer.

10. The method of claim 1, wherein the components are prototypes, the functionality further comprising repeating the actuating and detecting over successive iterations of one or more components manufactured by the additive manufacturing machine, each iteration including a modification of the prototype.

11. The method of claim 1, wherein the detected property relates to one or more of specific velocity, coefficient of lift, natural frequency, and dampening coefficient.

12. A non-transitory machine-readable storage medium having stored thereon a computer program for augmenting functionality of an additive manufacturing machine, the computer program comprising a routine of set instructions for causing the additive manufacturing machine to perform the steps of:
   additively manufacturing a component based on a component design having an autonomy characteristic; and
   actuating the component based on the autonomy characteristic;
   detecting a property of the component as a function of said actuating;
   repeating the actuating and detecting over successive iterations to thereby characterize the component, a material of the component, or the additive manufacturing machine,
   wherein the additive manufacturing machine is an off-the-shelf additive manufacturing machine.

13. The non-transitory machine-readable storage medium of claim 12, wherein the component is a prototype, the set of instructions further causing the additive manufacturing machine to perform the steps of repeating the additively building, actuating and detecting over successive iterations, each iteration including a modification of the prototype.

14. The non-transitory machine-readable storage medium of claim 12, wherein the detected property relates to one or more of specific velocity, coefficient of lift, natural frequency, and dampening coefficient.

15. The non-transitory machine-readable storage medium of claim 12, wherein the additive manufacturing machine is disposed in a spacecraft.

16. The non-transitory machine-readable storage medium of claim 12, wherein the additive manufacturing machine is a 3D printer.

* * * * *